United States Patent
Brubacher et al.

(10) Patent No.: US 7,418,486 B2
(45) Date of Patent: Aug. 26, 2008

(54) AUTOMATIC DISCOVERY AND CONFIGURATION OF EXTERNAL NETWORK DEVICES

(75) Inventors: Douglas Keith Brubacher, Sammamish, WA (US); Huseyin Gokmen Gok, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 772 days.

(21) Appl. No.: 10/456,068

(22) Filed: Jun. 6, 2003

(65) Prior Publication Data

US 2004/0249907 A1    Dec. 9, 2004

(51) Int. Cl.
G06F 15/177    (2006.01)

(52) U.S. Cl. .............. 709/220; 709/219; 709/223; 709/224; 709/228; 370/254; 370/389; 370/392

(58) Field of Classification Search .......... 709/220, 709/223, 219, 224, 228; 370/254, 389, 392
See application file for complete search history.

(56) References Cited

U.S. PATENT DOCUMENTS

| | | | | |
|---|---|---|---|---|
| 6,377,987 | B1 * | 4/2002 | Kracht | 709/220 |
| 6,516,345 | B1 * | 2/2003 | Kracht | 709/220 |
| 7,035,257 | B2 * | 4/2006 | Vafaei | 370/389 |
| 2002/0078198 | A1 * | 6/2002 | Buchbinder et al. | 709/224 |
| 2002/0112058 | A1 * | 8/2002 | Weisman et al. | 709/227 |
| 2003/0093769 | A1 * | 5/2003 | Kumar | 717/108 |
| 2003/0105854 | A1 * | 6/2003 | Thorsteinsson et al. | 709/223 |
| 2003/0167405 | A1 * | 9/2003 | Freund et al. | 713/201 |
| 2004/0095897 | A1 * | 5/2004 | Vafaei | 370/254 |

FOREIGN PATENT DOCUMENTS

WO    WO 02/01833 A1    1/2002

OTHER PUBLICATIONS

Kolic, Rafael, "The Advantages of the UPnP Internet Gateway Device", *Intel Developer Update Magazine*, Copyright Intel Corporation 2002, pp. 1-5.
Marynissen, Gert, "*The Speed Touch™ and Universal Plug'n Play*", Apr. 2002, XP-002299992, retrieved from http://www.speedtouchds1.com/pdf/UPnP_AppNote_ED01P01.pdf on Oct. 5, 2004.
Fout, Tom,, "*Universal Plug and Play (UPnP) Client Support*", XP-002299993, Aug. 1, 2001, retrieved from http://www.microsoft.com/technet/itsolutions/network/plan/insidenet/sohonet/upnpsup.mspx on Oct. 6, 2004.

* cited by examiner

*Primary Examiner*—Nathan Flynn
*Assistant Examiner*—Kyung H Shin
(74) *Attorney, Agent, or Firm*—Amin, Turocy & Calvin, LLP

(57) ABSTRACT

An improved system and method for discovering and configuring secure network topologies responds to existing networking environments and encompasses the dynamic detection and configuration of an appropriate hardware or software solution. In an embodiment of the invention, a broadcast mechanism is used to provide hardware device discovery while application programming interfaces provide discovery of software firewalls. In a further embodiment, a polling technique is used to ensure that the configuration of a gateway device does not change, endangering the protected network.

20 Claims, 5 Drawing Sheets

AUTOMATIC DISCOVERY AND CONFIGURATION OF EXTERNAL NETWORK DEVICES

FIELD OF THE INVENTION

This invention relates generally to a system and method for automatically discovering and configuring network security facilities, and more particularly relates to a system and method for dynamically combining the capability to discover both hardware and software firewall facilities available to a networked gateway server and automatically configuring external network gateway devices or server software to secure a network.

BACKGROUND

As computer networks become more common in private, commercial, institutional, and governmental settings, as well as other settings, the need to secure local networks against infiltration or attack from external entities has become increasingly important. For example, local networks often have a gateway or other entity through which clients on the local network may access a wide area network (WAN) such as the Internet. This arrangement is beneficial for many reasons. In a commercial setting, for example, a commercial enterprise may wish its employees to have access to the Internet for business reasons, but may want to control or monitor that access. The gateway can perform such controlling or monitoring functions. In addition, with all computers on the local network being exposed to the Internet via only one or a few portals, network administrators can more easily monitor threats or suspicious activity impinging on the local area network from the Internet.

Increasingly, hardware gateway devices, such as Internet Gateway Devices (IGDs) are being preferred over software gateways, such as are sometimes deployed on servers that serve as gateways. The reasons for the current prevalence of hardware devices in this role are many, but some of the primary advantages of hardware gateway devices include acquisition cost and cost of deployment.

Nonetheless, such hardware gateways or other hardware points of egress and entry cannot perform properly to safeguard or monitor the local network unless they are first identified and properly configured. In particular, network environments vary greatly in terms of structure and layout, and the type of communications that may be considered to be suspect varies from one network environment to another as well. For this reason, hardware network gateways and other hardware access points to the local network are typically configured upon installation prior to being pressed into service. Currently, discovery and configuration of hardware gateways, as well as reconfiguration of such devices, has been performed manually. For example, a network administrator may be aware of a newly installed device and will specifically communicate with and configure that device, such as via a configuration application over the local network. Not only does this require the administrator to be aware of the deployed hardware gateways, but in addition the administrator must be knowledgeable regarding the particular configuration routine and requirements of each device.

BRIEF SUMMARY OF THE INVENTION

In embodiments of the invention, a configuration system and method allow for dynamic selection between software or hardware firewall solutions, and automatic configuration of either solution in a seamless manner. In particular, the UPnP architecture is leveraged to provide discovery of external devices while public Application Programming Interfaces (APIs) are used in the case of software solutions. In both cases, configuration information can be exchanged via the same two techniques (UPnP or public APIs). A configuration system and method allow for simple discovery and configuration of Internet Gateway Devices. In particular, the Universal Plug and Play (UPNP) architecture is exploited to provide discovery of external devices, and to exchange configuration information for such devices. In addition, if the Dynamic Host Configuration Protocol (DHCP) is implemented on the target device, this protocol can be used during configuration within embodiments of the invention.

The selection of services to secure the network involves using UPnP to search beyond local devices to discover other networked devices as well, and using API's to discover software capabilities available to the host machine. In an embodiment of the invention, a broadcast mechanism is used to facilitate device discovery, while API's are used to perform the corresponding discovery of software capabilities. The discovery and configuration process comprises three general steps in an embodiment of the invention. First the device and software are discovered using UPnP, for the hardware solutions, and public API's for the software solutions. Second, in the hardware case the device transmits its identification, capabilities, etc. to the discovered unit, whereas in the software case there may be additional API calls to determine the capabilities and current configuration of the software firewall. Finally the hardware or software solution is configured. In the hardware case, the transmitted device information is used to configure the device, whereas in the software case, APIs are used to configure the software based on the collected configuration information. In an embodiment of the invention, a polling mechanism is used to ensure that the configuration of the device or software does not change, or that if it changes it can be quickly reset to its prior state.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
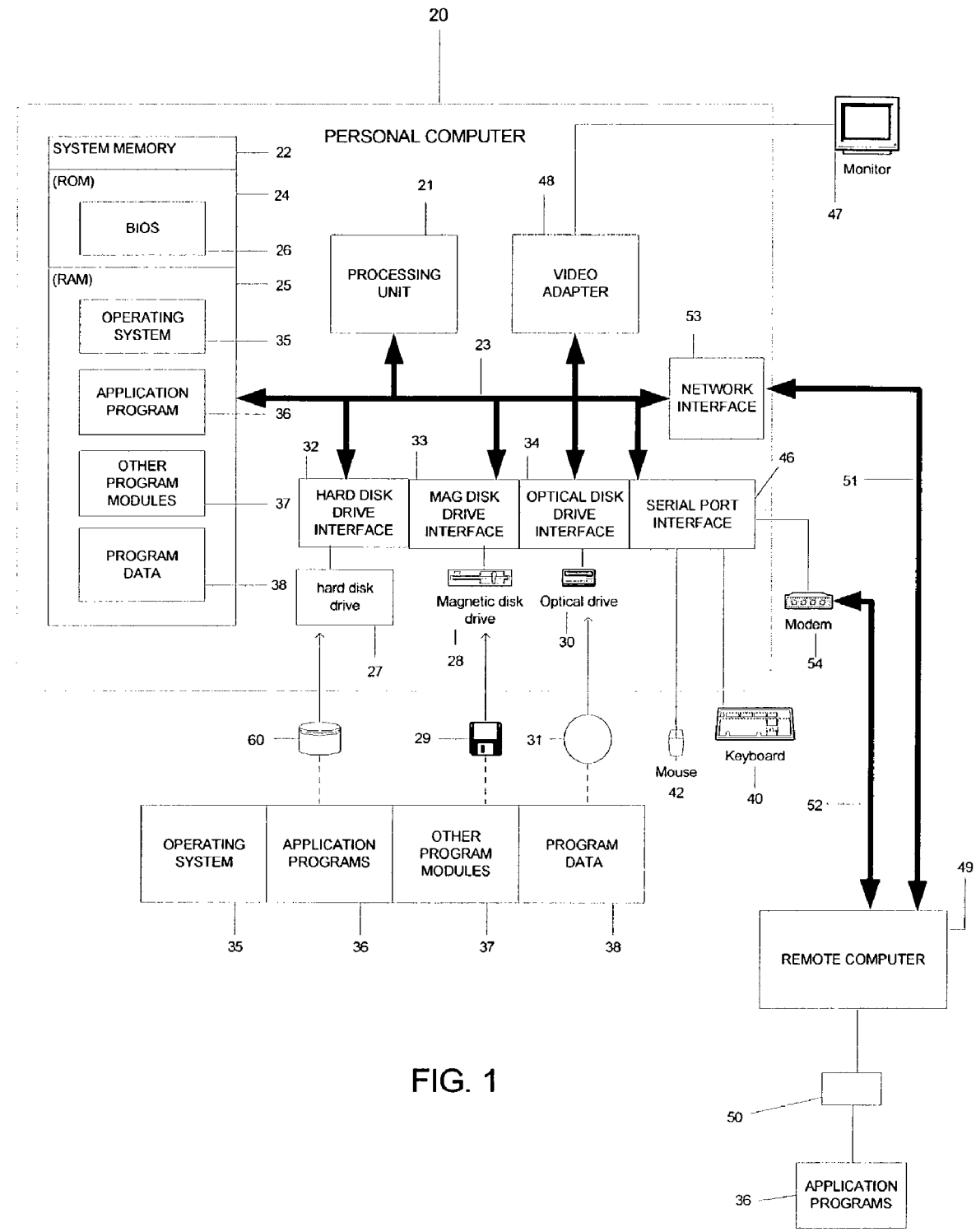
FIG. 1 is schematic diagram of a computing device usable to implement an embodiment of the invention.

Turning to the drawings, wherein like reference numerals refer to like elements, the invention is illustrated as being implemented in a suitable computing environment. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

This description begins with a description of a general-purpose computing device that may be used in an exemplary system for implementing the invention, after which the invention will be described in greater detail with reference to subsequent figures. Turning now to FIG. 1, a general purpose computing device is shown in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, many computers also include other peripheral output devices, not shown, such as speakers and printers.

The computer 20 preferably operates in a networked environment using logical connections to one or more remote computers, such as a remote computer 49. The remote computer 49 may be a personal computer, a server, a router, a network PC, a peer device or other common network node, and typically includes many or all of the elements described above relative to the computer 20, although only a memory storage device 50 has been illustrated in FIG. 1. In an embodiment of the invention, the remote computer 49 is a UPNP enabled Internet Gateway Device (IGD) and has the features typically associated with such a device, as will be appreciated by those of skill in the art. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the WAN 52. The modem 54, which may be internal or external, is connected to the system bus 23 via the serial port interface 46. Program modules depicted relative to the computer 20, or portions thereof, may be stored in the remote memory storage device if such is present. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that many of the acts and operations described hereinafter may also be implemented in hardware.

Figure 2:
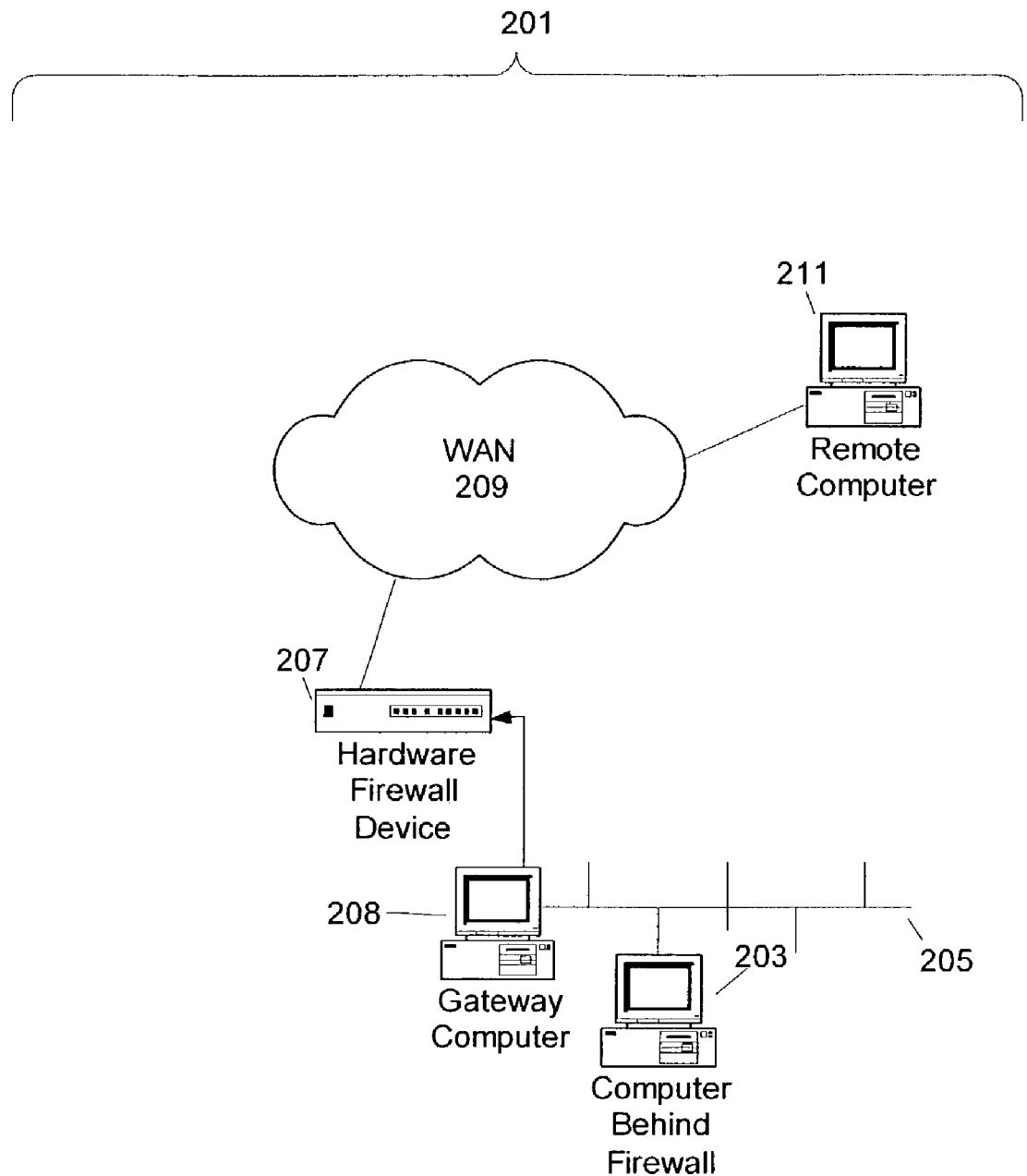
FIG. 2 is a schematic diagram of a computer network environment in which an embodiment of the invention may be implemented.

Turning to FIG. 2, an exemplary operating environment 201 in which embodiments of the invention may be implemented is shown. In particular, an IGD or other hardware gateway 207 and/or the firewall software capabilities available on a gateway computer 208 secures a local network 205 against improper access from a computer such as a remote computer 211 that may access the network 205 via a wide area network (WAN) 209. The WAN 209 may be any type of wide area network, and will typically, although not necessarily, comprise the Internet. The local network 205 may comprise any number and type of computers and/or devices, but a single computer 203 is shown for the sake of illustration. In an embodiment of the invention, the computer 208 is a small business server. Examples of such servers include email servers, web servers, and so on. The local network 205 may comprise additional resources such as directories, databases, etc.

In a typical usage scenario wherein the computer 208 is an email server, the server 208 transmits email from clients on the local network 205 to recipients, such as remote computer 211, via the WAN 209. The server 208 also forwards email received from the WAN 209, such as from remote computer 211, to intended recipients on the local network 205. The email server may have many of the features discussed with respect to computer 20 of FIG. 1. In a typical usage scenario wherein the computer 208 is a web server, the server 208 hosts one or more web sites accessible, such as to remote computer 211 over the WAN 209. Such sites may be commercial, educational, etc. In addition to the gateway 207 illustrated in FIG. 2, there may also be any number of other gateways present in the operating environment 201. The discovery and configuration of a hardware gateway device, such as device 207, and a software firewall, such as may reside on the gateway computer 208, will be described in greater detail with reference to FIG. 3.

Figure 3A:
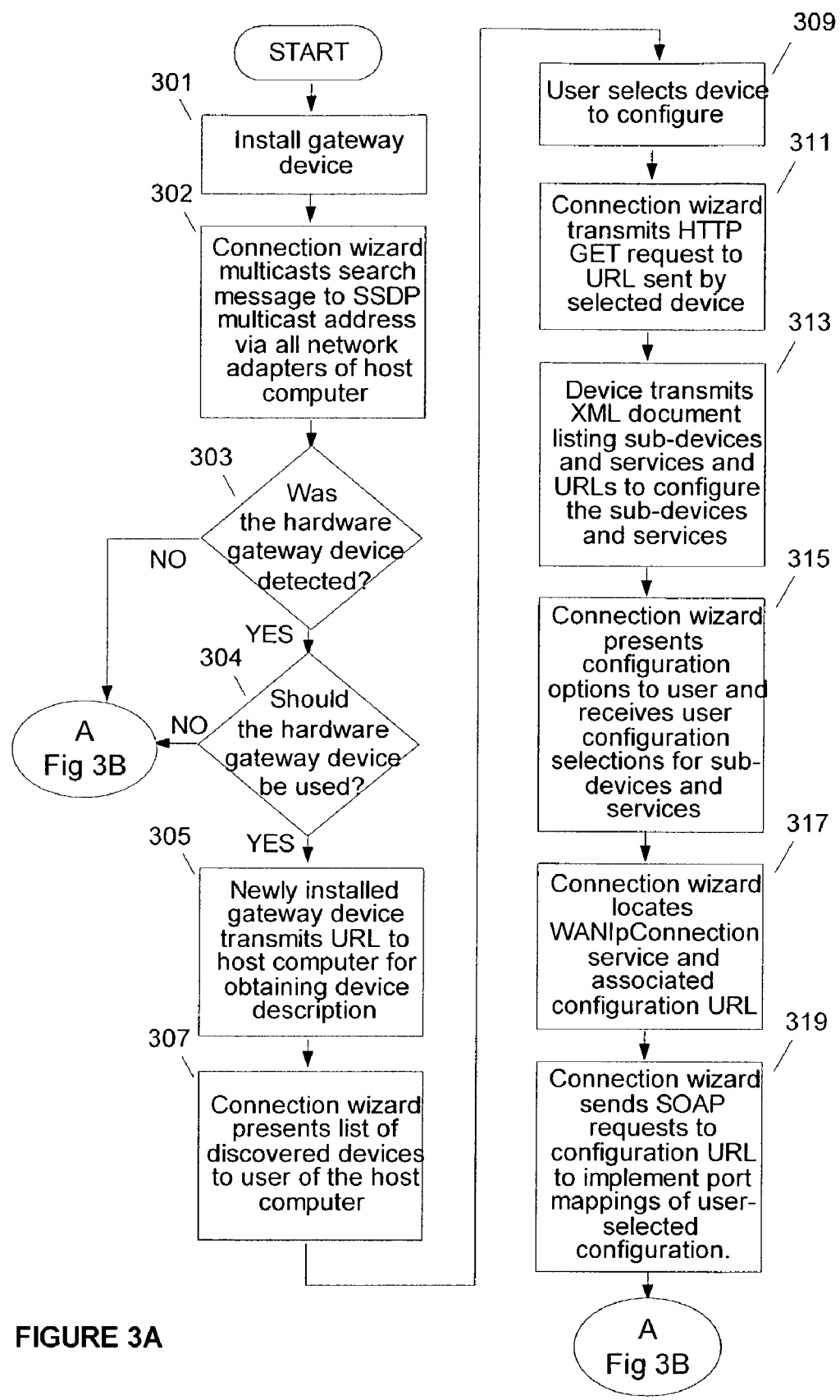
FIG. 3A is a flow chart illustrating steps taken in an embodiment of the invention to secure a local network.
Figure 3B:
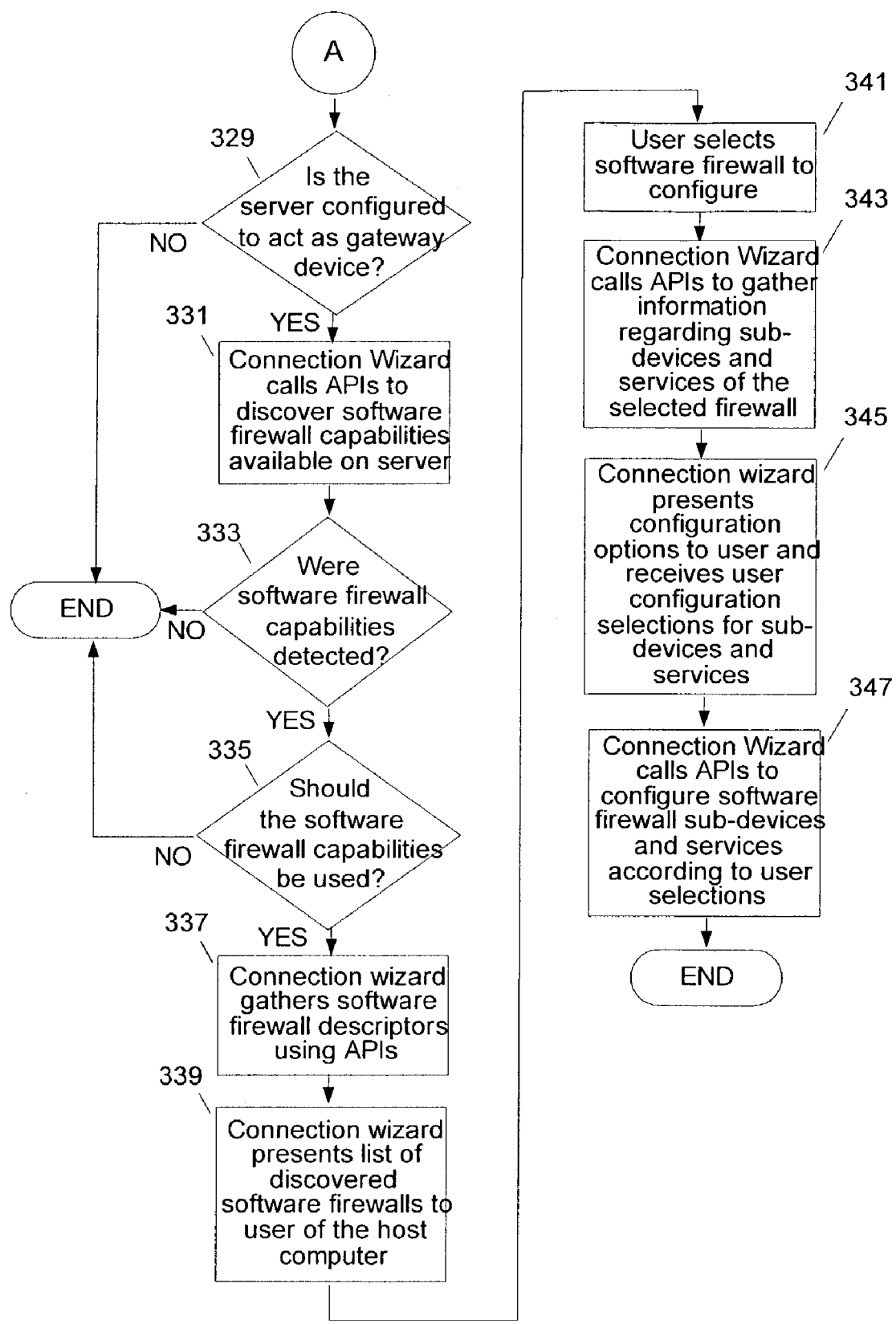
FIG. 3B is a flow chart illustrating further steps taken in an embodiment of the invention to secure a local network.

FIGS. 3A and 3B comprise a flow chart illustrating the steps taken to discover and configure a hardware gateway device and/or software firewall according to an embodiment of the invention. The discussion of FIGS. 3A and 3B will also refer when appropriate to elements of the architecture of FIG. 2. Initially at step 301, a UPNP enabled gateway device 207, such as a standard IGD, is physically installed via connection to the local network 205 if such is to be used. This step typically entails the physical connection of cabling and so on, so that the gateway device 207 is capable of sending and receiving transmissions over the local network 205. At this point, the local network 205 is not yet secured by the newly installed device 207.

Figure 4:
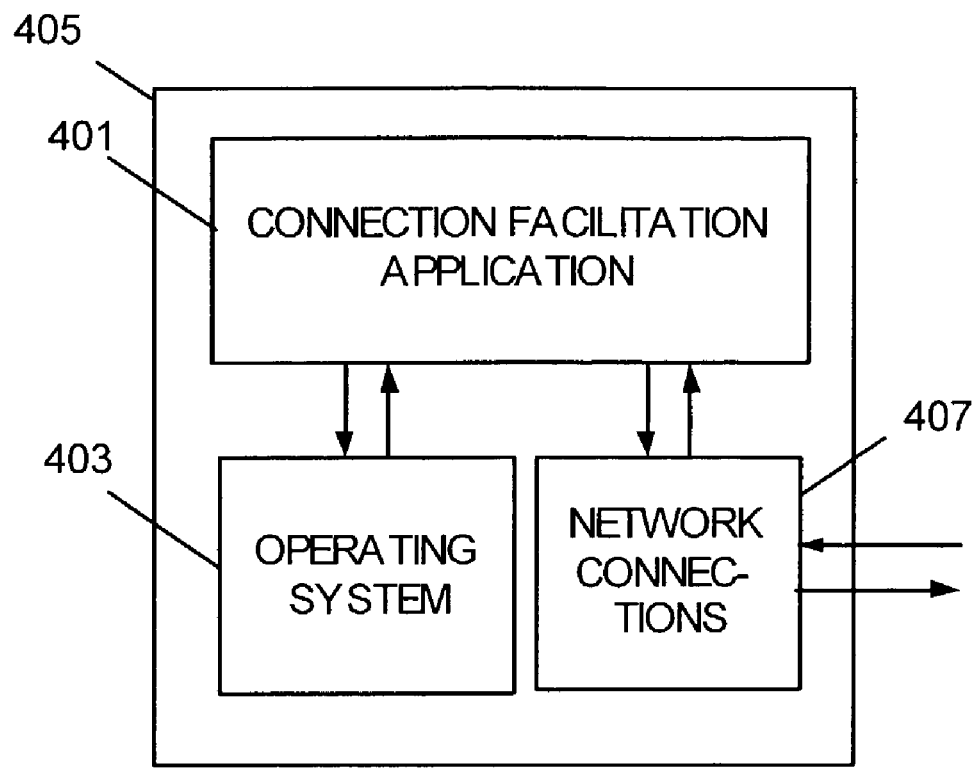
FIG. 4 is a schematic illustration of a device configuration facilitation application and its interfaces according to an embodiment of the invention.

In steps 303 through 347, to be discussed separately in greater detail below, a connection facilitation application, referred to herein as a connection "wizard," discovers the newly installed device 207 and/or software firewall facilities and configures the device and/or software firewall according to selections made by a user via the wizard. An exemplary arrangement of the connection wizard within the architecture of a discovering machine is shown schematically in FIG. 4. In particular, the connection wizard 401 is an application that accesses the operating system 403 of the host computer 405 to execute UPNP operations. The connection wizard 401 preferably is also able to send and receive transmissions using the networking connection facilities 407 of the host computer 405. The host computer 405 for the connection wizard 401 may be located anywhere on the local network 205, and may be, for example, the computer 203.

Referring again to the flow chart of FIG. 3A, the connection wizard 401 multicasts a search message to the Simple Search and Discovery Protocol (SSDP) multicast address via all of the network adapters (i.e. the connection facilities 407) of the host computer 405 at step 302. The multicast may be automatically initiated periodically at a predetermined interval or may be automatically triggered after a command or request from a user. At step 303 it is determined whether any hardware gateway devices were detected. If not, the process transitions to junction A of FIG. 3B. Otherwise, the process flows to step 304, whereat the user is prompted to indicate whether the detected hardware gateway device(s) should be used. If it is determined at step 304 that no detected gateway device should be used, the process transitions to junction A of FIG. 3B. Otherwise, the process moves to step 305, with only those gateway devices that should be used participating in this and subsequent steps. Assuming that the newly installed gateway device 207 is associated with a valid IP address, then it will respond in step 305 by transmitting a URL to the connection wizard 401 at the host computer 405 for use in obtaining device description information. It will be appreciated that URLs for more than one device may be received at the connection wizard 401.

At step 307, the connection wizard 401 presents a list of discovered devices to the user of the host computer 405. After the user selects a device to configure in step 309, such as device 207 in this example, then at step 311 the connection wizard 401 transmits an HTTP GET request to the URL that was sent by the device in step 305. Note that if no device is selected by the user in step 309, the process moves directly to junction A of FIG. 3B. At step 313, the device 207 responds by transmitting an XML document containing sub-devices and services contained in the root device as well as URLs usable to configure the sub-devices and services. At step 315, the connection wizard 401 presents configuration options for the sub-devices and services to the user and receives user configuration selections for the sub-devices and services. Typically the configuration thus specified will comprise a set of specified port mappings.

In step 317, the connection wizard 401 locates a configuration service such as a WANIpConnection service supported by the discovered device 207 as well as the configuration URL associated with the WANIpConnection service. Both the WANIpConnection service and the associated URL can be located in the list received from the device in step 313. Finally, at step 319, the connection wizard 401 sends Simple Object Access Protocol (SOAP) requests to the configuration URL to implement the port mappings according to the user-selected configuration. Thus, the newly installed device 207 has been automatically discovered and easily configured by the user, and the network is now secured by the device 207 as per the user-selected configuration. After step 319, the process flows to junction A of FIG. 3B for discovery and configuration of any software firewall or firewalls that are to be used. In an embodiment of the invention, if a hardware firewall has been configured as discussed above, then the process terminates after step 319 without configuring a software firewall.

At step 329, the process determines whether a server such as represented by gateway computer 208 is configured to act as a gateway computer, as opposed to simply being a client on the local network 205. If it is determined that the server is configured to act as a gateway computer, then at step 331, the connection wizard 401 calls the known APIs to discover software firewall capabilities available on the server. In an embodiment of the invention, two software firewall solutions are supported. In this embodiment of the invention, first the Microsoft® Internet Security and Acceleration Server (ISA) API's by Microsoft® Corporation of Redmond Wash. are called to determine if ISA is installed. If ISA is not installed then the Microsoft Windows Server Routing and Remote Access Service API's are called. If it is determined that the server is not configured to act as a gateway computer, the process terminates from step 329.

At step 333, the process determines whether any software firewall capabilities were discovered on the relevant machine. If none were, then the process terminates. Otherwise, the process flows to step 335, whereat the user is prompted to indicate whether the discovered software firewall capabilities should be used. If it is determined that the discovered software firewall capabilities should not be used, then the process terminates. Otherwise the process flows to step 337, whereat the connection wizard 401 uses known APIs as discussed above to gather descriptive information regarding the discovered software firewall capabilities.

At step 339, the connection wizard 401 presents a list of discovered software firewalls to the user of the host computer. At step 341, the user selects a software firewall for configuration. Subsequently, the connection wizard 401 calls known APIs to gather information regarding sub-devices and services of the selected firewall at step 343. At step 345, the connection wizard 401 presents configuration options to the user and receives user configuration selections for sub-devices and services of the selected firewall. Finally at step 347, the connection wizard 401 calls APIs to configure software firewall sub-devices and services according to user selections.

In an embodiment of the invention, one of the services supported by the newly installed device 207 is the Dynamic Host Configuration Protocol (DHCP). DHCP is an Internet protocol typically used for configuring computers that are using TCP/IP. DHCP can be used to assign IP addresses, provide stack configuration information, as well as to provide other configuration information. If the device 207 supports DHCP, then this behavior can be configured as well.

In an embodiment of the invention, the connection wizard 401 periodically polls the local network 205 to determine whether any new external hardware network devices have been added. Typically, even when such devices are UPNP enabled, there is no notice given when a new device is installed. In a further embodiment of the invention, the connection wizard 401 periodically assesses the configuration information of known devices to detect any change in configuration that could endanger security of the network 205. If a change in configuration is detected, the connection wizard 401 reconfigures the relevant device to its user-selected configuration.

Although those of skill in the art will appreciate that the APIs referenced above may be replaced by any suitable APIs, the following is a listing of exemplary known Microsoft® Routing and Remote Access Service APIs that are useful in implementing embodiments of the invention.

MprAdminBufferFree

MprAdminDeregisterConnectionNotification

MprAdminGetErrorString

MprAdminInterfaceConnect

MprAdminInterfaceCreate

MprAdminInterfaceDelete

MprAdminInterfaceDeviceGetInfo

MprAdminInterfaceDeviceSetInfo

MprAdminInterfaceDisconnect

MprAdminInterfaceEnum

MprAdminInterfaceGetCredentials

MprAdminInterfaceGetCredentialsEx

MprAdminInterfaceGetHandle

MprAdminInterfaceGetInfo

MprAdminInterfaceQueryUpdateResult

MprAdmnInterfaceSetCredentials

MprAdminInterfaceSetCredentialsEx

MprAdminInterfaceSetInfo

MprAdminInterfaceTransportAdd

MprAdminInterfaceTransportGetInfo

MprAdminInterfaceTransportRemove

MprAdminInterfaceTransportSetInfo

MprAdminInterfaceUpdatePhonebookInfo

MprAdminInterfaceUpdateRoutes

MprAdminIsServiceRunning

MprAdminRegisterConnectionNotification

MprAdminServerConnect

MprAdminServerDisconnect

MprAdminServerGetCredentials

MprAdminServerGetInfo

MprAdminServerSetCredentials

MprAdminTransportCreate

MprAdminTransportGetInfo

MprAdminTransportSetInfo

MprConfigBufferFree

MprConfigGetFriendlyName

MprConfigGetGuidName

MprConfigInterfaceCreate

MprConfigInterfaceDelete

MprConfigInterfaceEnum

MprConfigInterfaceGetHandle

MprConfigInterfaceGetInfo

MprConfigInterfaceSetInfo

MprConfigInterfaceTransportAdd

MprConfigInterfaceTransportEnum

MprConfigInterfaceTransportGetHandle

MprConfigInterfaceTransportGetInfo

MprConfigInterfaceTransportRemove

MprConfigInterfaceTransportSetInfo

MprConfigServerBackup

MprConfigServerConnect

MprConfigServerDisconnect

MprConfigServerGetInfo

MprConfigServerInstall

MprConfigServerRestore

MprConfigTransportCreate

MprConfigTransportDelete

MprConfigTransportEnum

MprConfigTransportGetHandle

MprConfigTransportGetInfo

MprConfigTransportSetInfo

Although those of skill in the art will appreciate that the APIs referenced above may be replaced by any suitable APIs, the following is a listing of exemplary known Microsoft®

Internet Security and Acceleration COM interfaces, each comprising one or more APIs, that are useful in implementing embodiments of the invention.

FPC Object
FPCAccessControlEntry Object
FPCAccessControlList Collection
FPCAccount Object
FPCAccounts Collection
FPCActiveCacheConfiguration Object
FPCAdapter Object
FPCAdapters Collection
FPCAlert Object
FPCAlerts Collection
FPCAlertAction Object
FPCAlertActions Collection
FPCAlertInfo Object
FPCAlertNotification Object
FPCApplicationFilter Object
FPCApplicationFilters Collection
FPCArray Object
FPCArrays Collection
FPCArrayPolicyConfig Object
FPCArrayPolicyConfigs Collection
FPCAutoDial Object
FPCBackupRoute Object
FPCBandwidthPriority Object
FPCBandwidthPriorities Collection
FPCBandwidthRule Object
FPCBandwidthRules Collection
FPCCache Object
FPCCacheConfiguration Object
FPCCacheContents Object
FPCCacheDrive Object
FPCCacheDrives Collection
FPCClientAddressSet Object
FPCClientAddressSets Collection
FPCClientAutoScript Object
FPCClientBackupRoute Object
FPCClientConfig Object
FPCClientConfigSettings Collection
FPCClientSettingsSection Object
FPCContentGroup Object
FPCContentGroups Collection
FPCCredentials Object
FPCDeniedMethod Object
FPCDeniedMethods Collection
FPCDestination Object
FPCDestinationSet Collection
FPCDestinationSets Collection
FPCDialupEntry Object
FPCDialupEntries Collection
FPCDialupNetworkConnections Collection
FPCDirectAddressDestination Object
FPCDirectAddressDestinations Collection
FPCDirectIpDestination Object
FPCDirectIpDestinations Collection
FPCDiskDrive Object
FPCDiskDrives Collection
FPCEnterprise Object
FPCEnterprisePolicy Object
FPCEnterprisePolicies Collection
FPCEventDefinition Object
FPCEventDefinitions Collection
FPCExtensions Object
FPCFilterProtocol Object
FPCFilterProtocols Collection
FPCFirewallClientConfig Object
FPCFirewallChaining Object
FPCFirewallSession Object
FPCFirewallSessions Collection
FPCFirewallSessionConnection Object
FPCFirewallSessionConnections Collection
FPCFTPCacheConfiguration Object
FPCHTTPCacheConfiguration Object
FPCIpPacketFilter Object
FPCIpPacketFilters Collection
FPCIpRange Object
FPCLAT Collection
FPCLATEntry Object
FPCLDT Collection
FPCLDTEntry Object
FPCListenEntry Object
FPCListenEntries Collection
FPCLog Object
FPCLogs Collection
FPCNetworkConfiguration Object
FPCPolicyElements Object
FPCPrimaryRoute Object
FPCProtocolConnection Object
FPCProtocolConnections Collection FPCProtocolDefinition Object
FPCProtocolDefinitions Collection
FPCProtocolRule Object
FPCProtocolRules Collection
FPCServerPublishingRule Object
FPCServerPublishingRules Collection
FPCPublishing Object
FPCRef Object
FPCRefs Collection
FPCRoutingRule Object
FPCRoutingRules Collection
FPCSchedule Object
FPCSchedules Collection
FPCScheduledContentDownload Collection
FPCScheduledContentDownloadConfig Object
FPCSecurityDescriptor Object
FPCServer Object
FPCServers Collection
FPCSignaledAlert Object
FPCSignaledAlerts Collection
FPCSiteAndContentRule Object
FPCSiteAndContentRules Collection
FPCSnapinNode Object
FPCSSLCertificate Object
FPCSSLCertificates Collection
FPCTunnelPortRange Object
FPCTunnelPortRanges Collection
FPCVendorParametersSet Object
FPCVendorParametersSets Collection
FPCWebBrowserClientConfig Object
FPCWebFilter Object
FPCWebFilters Collection
FPCWebProxy Object
FPCWebPublishingRule Object
FPCWebPublishingRules Collection
FPCWebRequestConfiguration Object
FPCWebSession Object
FPCWebSessions Collection
FPCWebSessionAdditionalInfo Object It will be appreciated that an improved system and method for discovering and configuring secure network topologies that responds to existing networking environments and encompasses the dynamic detection and configuration of an appropriate hardware or software solution has been described. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A method of securing a local computer network with respect to a wide area computer network, the method comprising:
employing a connection wizard to dynamically select between configuring a software or hardware firewall solution to secure the local computer network;
automatically configuring the selected solution in a seamless manner;
dynamically detecting whether a usable hardware gateway device is installed between the local computer network and the wide area computer network;
prompting a user to indicate if the installed usable hardware should be employed;
if it is determined that a usable hardware gateway device should be employed, communicating with the hardware gateway device over the local network to retrieve description information regarding the device, presenting configuration options based on the retrieved information to a user via the connection wizard, receiving a user selection to configure the device, and automatically configuring the device in accordance with the user selection;
if it is determined that a useable hardware gateway device should not be employed, dynamically detecting whether a usable software firewall is installed between the local computer network and the wide area computer network, and if a usable software firewall is installed, gathering description information regarding the firewall, presenting configuration options based on the gathered information to the user via the connection wizard, receiving a user selection to configure the firewall, and automatically configuring the firewall in accordance with the user selection;
periodically assessing a configuration of one or more known devices to detect a change in configuration that endangers the security of the local computer network; and
reconfiguring the one or more known devices to a user selected configuration if the change is detected.

2. The method according to claim 1, wherein detecting whether a usable hardware gateway device is installed between the local computer network and the wide area computer network further comprises:
automatically transmitting a multicast discovery transmission via the local network; and
receiving a response to the multicast discovery transmission from the gateway device, wherein the response comprises a URL (uniform resource locator) for use in contacting the gateway device over the local network.

3. The method according to claim 2, wherein communicating with the hardware gateway device over the local network to retrieve description information regarding the device further comprises:
automatically transmitting a device description request via the local network to the gateway device; and in response to the device description request transmission, receiving from the gateway device a listing of services supported by the gateway device.

4. The method according to claim 1, wherein the listing of services supported by the gateway device further comprises a listing of sub-devices supported by the gateway device.

5. The method according to claim 2, wherein detecting whether a usable hardware gateway device is installed between the local computer network and the wide area computer network further comprises receiving a user indication of usability of a hardware gateway device.

6. The method according to claim 3, wherein the listing of services supported by the gateway device further comprises a respective locator associated with each service, whereby the respective URL associated with a service is usable to configure that service.

7. The method according to claim 2, wherein automatically transmitting a multicast discovery transmission via the local network comprises;
waiting for a predetermined period to expire; and
upon expiration of the predetermined period, transmitting the multicast discovery transmission via the local network.

8. The method according to claim 3, wherein the listing of services supported by the gateway device comprises a listing corresponding to the Dynamic Host Configuration Protocol.

9. The method according to claim 1, wherein detecting whether a usable software firewall is installed between the local computer network and the wide area computer network further comprises receiving a user indication of usability of a software firewall.

10. The method according to claim 1, wherein gathering description information regarding the firewall further comprises calling an API and receiving the description information in response to calling the API.

11. The method according to claim 1, wherein automatically configuring the firewall in accordance with the user selection further comprises calling an API, wherein the call to the API comprises configuration information.

12. A computer-readable medium having stored thereon computer-readable instructions for performing the method according to claim 1.

13. A computer-readable medium having stored thereon computer-readable instructions for performing the method according to claim 6.

14. A computer-readable medium having stored thereon computer-readable instructions for performing the method according to claim 7.

15. The method according to claim 1, wherein receiving a response to the multicast discovery transmission comprises receiving a plurality of responses from a plurality of devices including the gateway device.

16. The method according to claim 15, wherein automatically transmitting a device description request via the local network to the gateway device further comprises:
presenting a listing of the plurality of devices to a user of the host computer; and
receiving from the user of the host computer a selection of the gateway device.

17. A computer executable system for automatically discovering and configuring network security facilities comprising the following computer executable components stored on one or more computer readable media:
a first component to multicast a search message via one or more network adapters of a host computer;
a second component that responds to the search message hence indicating presence of a hardware gateway device;
the first component automatically discovers software firewall capabilities within a gateway server if no useable hardware gateway devices are detected to secure a network;
a third component that dynamically selects between the software firewall capabilities or the hardware gateway device by employing a connection wizard, the third component automatically configures the selected solution in a seamless manner; and
a fourth component that periodically assesses a configuration of one or more known devices to detect a change in configuration that endangers the security of the local computer network, the fourth component reconfigures the one or more known devices to a user selected configuration if the change is detected.

18. The system of claim 17, the second component responds by transmitting a URL (uniform resource locator) that is employed in obtaining device description information.

19. The system of claim 18, wherein upon selection by a user, the first component locates a configuration service supported by the selected hardware gateway device as well as a URL associated with the configuration service from a list transmitted by the gateway device so that the hardware gateway device can be automatically configured.

20. The system of claim 17, the first component presents a list of the software firewall capabilities discovered on the server for selection to a user wherein upon user selection, the first component configures the selected software firewall by employing known APIs (application programming interfaces).

* * * * *